US012811279B2

(12) United States Patent
Jiang et al.

(10) Patent No.: US 12,811,279 B2
(45) Date of Patent: Nov. 24, 2026

(54) ELECTRONIC DEVICES WITH ANTENNAS HAVING COMPOUND CURVATURE

(71) Applicant: Apple Inc., Cupertino, CA (US)

(72) Inventors: Yi Jiang, Cupertino, CA (US); Boon W Shiu, Palo Alto, CA (US); Jason C Sauers, Sunnyvale, CA (US); Jia-Woei Chen, Campbell, CA (US); Killian J Poore, San Jose, CA (US); Lijun Zhang, Los Gatos, CA (US)

( * ) Notice: Subject to any disclaimer, the term of this patent is extended or adjusted under 35 U.S.C. 154(b) by 118 days.

(21) Appl. No.: 18/436,928

(22) Filed: Feb. 8, 2024

(65) Prior Publication Data

US 2024/0186685 A1 Jun. 6, 2024

Related U.S. Application Data

(63) Continuation of application No. PCT/US2022/041184, filed on Aug. 23, 2022.

(60) Provisional application No. 63/238,667, filed on Aug. 30, 2021.

(51) Int. Cl.
*H01Q 1/27* (2006.01)
*H01Q 9/04* (2006.01)

(52) U.S. Cl.
CPC .......... *H01Q 1/273* (2013.01); *H01Q 9/0421* (2013.01)

(58) Field of Classification Search
CPC ........ H01Q 1/273; H01Q 9/0421; H01Q 1/24; H01Q 9/42; H01Q 1/38; G02B 27/0176
See application file for complete search history.

(56) References Cited

U.S. PATENT DOCUMENTS

| | | | | |
|---|---|---|---|---|
| 7,911,387 | B2 | 3/2011 | Hill et al. | |
| 8,395,555 | B2 | 3/2013 | Hobson et al. | |
| 8,686,297 | B2 | 4/2014 | Shiu et al. | |
| 9,190,720 | B2 | 11/2015 | Shedletsky | |
| 2015/0243937 | A1 | 8/2015 | Dinh et al. | |
| 2015/0253573 | A1* | 9/2015 | Sako .................... | H04N 13/398 345/207 |
| 2015/0311960 | A1 | 10/2015 | Samardzija et al. | |
| 2016/0006123 | A1 | 1/2016 | Li et al. | |
| 2017/0068500 | A1* | 3/2017 | Rochford ................ | G06F 3/011 |
| 2018/0152549 | A1 | 5/2018 | Hobson et al. | |

(Continued)

FOREIGN PATENT DOCUMENTS

| | | |
|---|---|---|
| CN | 208805616 U | 4/2019 |
| JP | 2012019064 A | 1/2012 |
| WO | 2021132181 A1 | 7/2021 |

*Primary Examiner* — Michael M Bouizza
(74) *Attorney, Agent, or Firm* — Treyz Law Group, P.C.; Tianyi He

(57) ABSTRACT

A head-mounted device may have a head-mounted housing that is configured to be worn on a head of a user. While the head-mounted device is being worn, left and right displays in optical modules in the head-mounted device may provide images to eye boxes located rearward of the head-mounted device. A forward-facing publicly viewable display on a front portion of the head-mounted device may be covered with a transparent housing portion forming a display cover layer. A dielectric member having a ring-shaped edge portion surrounding the publicly viewable display may be mounted under a corresponding edge portion of the display cover layer. A flexible printed circuit antenna with compound curvature may be laminated to the edge portion of the dielectric member.

20 Claims, 5 Drawing Sheets

(56) References Cited

U.S. PATENT DOCUMENTS

| | | | | |
|---|---|---|---|---|
| 2018/0270900 | A1 | 9/2018 | Zhu et al. | |
| 2019/0139290 | A9* | 5/2019 | Solomon | G06F 3/013 |
| 2021/0089150 | A1 | 3/2021 | Wang et al. | |
| 2021/0318715 | A1* | 10/2021 | Ha | H10K 59/121 |
| 2023/0300313 | A1* | 9/2023 | Olson | G02B 27/0172<br>348/53 |

* cited by examiner

ELECTRONIC DEVICES WITH ANTENNAS HAVING COMPOUND CURVATURE

This application is a continuation of international patent application No. PCT/US2022/041184, filed Aug. 23, 2022, which claims priority to U.S. provisional patent application No. 63/238,667, filed Aug. 30, 2021, which are hereby incorporated by reference herein in their entireties.

FIELD

This relates generally to electronic devices, and, more particularly, to electronic devices with components such as antennas.

BACKGROUND

Electronic devices such as head-mounted devices and other devices may have input-output components. The input-output components may include components such as antennas for handling wireless communications.

SUMMARY

A head-mounted device may have a head-mounted housing that is configured to be worn on a head of a user. While the head-mounted device is being worn, rear-facing left and right displays in the head-mounted device may provide images to respective left and right eye boxes for viewing by a user. The head-mounted device may have a publicly viewable display. The publicly viewable display may be mounted on a front side of the head-mounted housing facing away from the eye boxes.

A display cover layer may overlap the publicly viewable display. A dielectric member may be interposed between the display cover layer and the publicly viewable display. A ring-shaped peripheral portion of the dielectric member may surround the publicly viewable display. The display cover layer and the dielectric member may have surfaces of compound curvature. For example, an edge portion of the display cover layer may have inner and outer surfaces of compound curvature and the ring-shaped peripheral portion of the dielectric member may have inner and outer surfaces of compound curvature.

An antenna may be attached to the dielectric member using adhesive. The antenna may be a flexible printed circuit antenna having inner and outer surfaces of compound curvature. In an illustrative configuration, the outer compound curvature surface of the flexible printed circuit antenna may be attached with adhesive to a corresponding inner compound curvature surface of the ring-shaped peripheral portion of the dielectric member. The ring-shaped portion of the dielectric member in this configuration may lie between the antenna and the edge portion of the display cover layer.

DETAILED DESCRIPTION

Electronic devices may be provided with components such as antennas. The electronic devices may include portable electronic devices, wearable devices, desktop devices, embedded systems, and other electronic equipment. Illustrative configurations in which the electronic devices include a head-mounted device may sometimes be described herein as an example.

Antennas may be formed from thin flexible substrates such as flexible printed circuits. A flexible printed circuit antenna may have metal traces that are patterned to form an antenna resonating element (sometimes referred to as an antenna resonating structure or antenna resonator). The metal traces may be supported by a flexible printed circuit substrate layer. The flexible printed circuit substrate layer may be formed from one or more sheets of polyimide or layers of other polymer.

Electronic device housing structures and other parts of an electronic device may include areas that are characterized by curved surfaces that can be flattened into a plane without distortion (sometimes referred to as developable surfaces or curved surfaces without compound curvature). Electronic device housing structures and other parts of an electronic device may also include areas that are characterized by compound curvature (surfaces that can only be flattened into a plane with distortion, sometimes referred to as non-developable surfaces).

To help conform a flexible printed circuit antenna to a surface of an electronic device housing structure or other dielectric member in an electronic device and/or to otherwise provide the antenna with a shape that facilitates installation and use of the antenna in a device with potentially complex shapes such as surfaces with compound curvature, a flexible printed circuit antenna may be formed into a three-dimensional shape (e.g., an unwrinkled shape characterized by surfaces of compound curvature). A flexible printed circuit antenna that has been provided with compound curvature surfaces in this way may then be attached to a supporting housing structure with compound curvature. For example, a flexible printed circuit antenna with compound curvature may be laminated to a dielectric member having matching compound curvature using a layer of adhesive.

Figure 1:
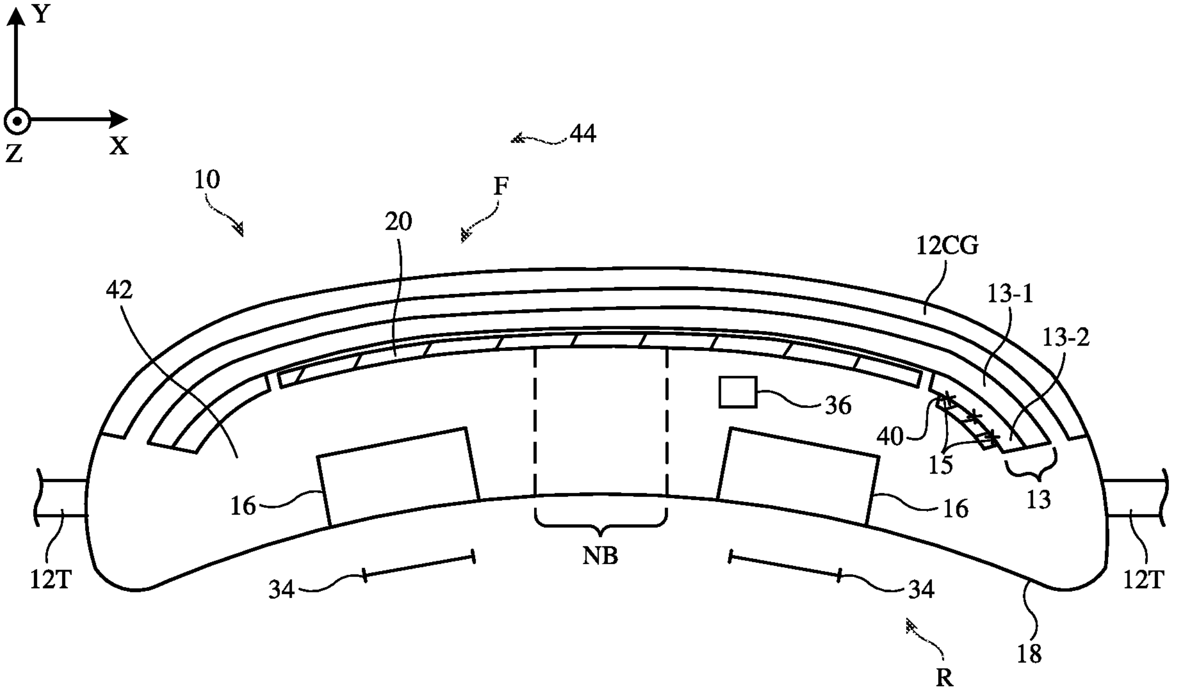
FIG. 1 is a top view of an illustrative electronic device with an antenna in accordance with an embodiment.

FIG. 1 is a top view of an illustrative electronic device that may include a flexible printed circuit antenna with compound curvature. In the example of FIG. 1, device 10 is a head-mounted device. In general, device 10 may be any suitable electronic equipment.

As shown in FIG. 1, head-mounted device 10 may include housing 12. Housing 12 is configured to be worn on a user's head and may sometimes be referred to as a head-mounted housing or head-mounted support structure. Housing 12 may have curved head-shaped surfaces, a nose-bridge portion such as portion NB that is configured to rest on a user's nose when device 10 is on a user's head, may have a headband such as strap 12T for supporting device 10 on the user's head, and/or may have other features that allow device 10 to be worn by a user.

Housing 12 may have walls or other structures that separate an interior region of device 10 such as interior region 42 from an exterior region surrounding device 10 such as exterior region 44. As an example, housing 12 may include a transparent layer that forms a housing wall on front F of device 10 such as display cover layer 12CG. Housing 12 may also include internal frame structures (e.g., a metal chassis), cosmetic covering members, polymer layers (e.g., fully or partly transparent polymer layers), housing walls formed from polymer and/or other materials, and/or other housing structures. In an illustrative configuration, housing 12 includes a dielectric structure such as dielectric member 13 that is overlapped by display cover layer 12CG. Dielectric member 13, which may sometimes be referred to as a polymer layer, shroud, dielectric layer, or dielectric structure, may be formed from one or more individual dielectric structures (e.g., structures formed from polymer, glass, ceramic, and/or other dielectric). In the example of FIG. 1, dielectric member 13, includes a first dielectric layer such as polymer layer 13-1 that extends across substantially all of front F of device 10 (e.g., layer 13-1 of FIG. 1 has a footprint similar to or the same as that of layer 12CG). With this arrangement, layer 13-1, which may sometimes be referred to as a shroud canopy or shroud, has a central portion that overlaps display 20 and has a peripheral portion (e.g., the portion under edge portion E of display cover layer 12CG) with a ring shaped footprint that surrounds display 20. Dielectric member 13 of FIG. 1 also has a second polymer layer such as layer 13-2. Layer 13-2, which may sometimes be referred to as a shroud trim or shroud, may have a ring shape that surrounds display 20. In the peripheral portion of member 13, layers 13-1 and 13-2 may be attached to each other using adhesive, press-fit connections, screws or other fasteners, and/or other attachment mechanisms.

Display cover layer 12CG and member 13 (e.g., layer 13-1) may overlap a forward-facing display such as display 20 (e.g., a flexible display panel formed from a pixel array based on organic light-emitting diodes or other display panel). Layer 13-1 may be formed from fully transparent polymer or partly transparent polymer that helps hide display 20 from view. Display cover layer 12CG may be formed from transparent polymer or glass (as examples).

Portions of display cover layer 12CG and member 13 such as edge portions of display cover layer 12CG and member 13 that surround display 20 may have curved cross-sectional profiles. As an example, edge portion E of cover layer 12CG and the underlying edge portion of member 13 may have inner and/or outer surfaces characterized by compound curvature (e.g., non-developable surfaces). The central portions of display cover layer 12CG and member 13 may have compound curvature and/or may have developable surfaces. In an illustrative arrangement, cover layer 12CG has inner and outer surfaces with compound curvature and member 13 has surfaces of compound curvature around the edges of device 10 (e.g., the portion of member 13 surrounding display 20) and has developable surfaces overlapping display 20. In this illustrative configuration, display 20 may be a flexible display panel that is bent into a curved shape (e.g., a curved shape following the curved face of a user) and that is characterized by inner and outer developable surfaces. The portion of member 13 overlapping display 20 may have corresponding inner and outer developable surfaces. Other arrangements for the shapes of display cover layer 12CG and member 13 may be used in device 10, if desired.

Device 10 may have one or more antennas. As an example, antenna 40 may be mounted in device 10 along the edge of display 20. As shown in FIG. 1, antenna 40 may, as an example, be mounted to the inner surface of dielectric member 13 under edge portion E of display cover layer 12CG. During operation, antenna signals may pass through these overlapping dielectric structures.

Antenna 40 may be attached to the surface of member 13 (e.g., the inner surface of layer 13-2 in the example of FIG. 1) using adhesive 15. The portion of the inner surface of member 13 to which antenna 40 is mounted in this way may have compound curvature. Antenna 40 may be formed from a flexible printed circuit with matching compound curvature.

Device 10 may include electrical components 36 (e.g., integrated circuits, sensors, control circuitry, light-emitting diodes, lasers, and other light-emitting devices, other control circuits and input-output devices, etc.). Components 36 may be mounted on printed circuits and/or other structures within device 10 (e.g., in interior region 42).

To present a user with images for viewing from eye boxes such as eye box 34, device 10 may include rear-facing displays in optical modules 16. There may be, for example, a left rear-facing display in a left optical module 16 for presenting an image through a left lens to a user's left eye in a left eye box 34 and a right rear-facing display in right optical module 16 for presenting an image through a right lens to a user's right eye in a right eye box 34.

The user's eyes are located in eye boxes 34 at rear R of device 10 when inwardly facing surface 18 of housing 12 rests against the outer surface of the user's face. On rear R, housing 12 may have cushioned structures (sometimes referred to as light seal structures) to enhance user comfort as surface 18 rests against the user's face. Device 10 may have forward-facing components such has forward-facing cameras and other sensors on front F that face outwardly away from the user. These components may generally be oriented in the +Y (forward) direction of FIG. 1.

During operation, device 10 may receive image data (e.g., image data for video, still images, etc.) and may present this information on the displays of optical modules 16. Device 10 may also receive other data, control commands, user input, etc. Device 10 may transmit data to accessories and other electronic equipment. For example, image data from a forward-facing camera may be provided to an associated device, audio output may be provided to a device with speakers such as a headphone device, user input and sensor readings may be transmitted to remote equipment, etc.

Communications such as these may be supported using wired and/or wireless communications. In an illustrative configuration, components 36 may include wireless communications circuitry for supporting wireless communications between device 10 and remote wireless equipment (e.g., a cellular telephone, a wireless base station, a computer, headphones or other accessories, a remote control, peer devices, internet servers, and/or other equipment). Wireless communications may be supported using one or more antennas operating at one or more wireless communications frequencies (see, e.g., antenna 40 of FIG. 1). In an illustrative configuration, one or more antennas may be coupled to wireless transceiver circuitry. The wireless transceiver circuitry may include transmitter circuitry configured to transmit wireless communications signals using the antenna(s) and receiver circuitry configured to receive wireless communications signals using the antenna(s).

The wireless circuitry of device 10 may be formed from one or more integrated circuits, power amplifier circuitry, low-noise input amplifiers, passive RF components, one or more antennas, transmission lines, and other circuitry for handling RF wireless signals. The wireless circuitry may include radio-frequency transceiver circuitry for handling various radio-frequency communications bands. For example, the wireless circuitry of device 10 may include wireless local area network (WLAN) and wireless personal area network (WPAN) transceiver circuitry. This transceiver circuitry may handle 2.4 GHz and 5 GHz bands for WiFi® (IEEE 802.11) communications and other WLAN communications and the 2.4 GHz Bluetooth® communications band or other WPAN bands and may sometimes be referred to herein as WLAN/WPAN transceiver circuitry or local transceiver circuitry.

The wireless circuitry of device 10 may use remote wireless circuitry such as cellular telephone transceiver circuitry for handling wireless communications in frequency ranges (communications bands) such as a cellular low band (LB) from 600 to 960 MHz, a cellular low-midband (LMB) from 1410 to 1510 MHz, a cellular midband (MB) from 1710 to 2170 MHz, a cellular high band (HB) from 2300 to 2700 MHZ, a cellular ultra-high band (UHB) from 3300 to 5000 MHz, or other communications bands between 600 MHz and 5000 MHz. If desired, the cellular telephone transceiver circuitry may support 5G communications using a low band at 600-850 MHz, a mid-band at 2.5-3.7 GHZ, and a high band at 25-39 GHz. Wireless communications may also be provided using other frequency ranges (e.g., frequencies above 100 MHz, above 1 GHz, 1-30 GHz, 100 Mhz-300 GHz, 24 GHz, less than 300 GHz, less than 100 GHz, 10-300 GHz or other mm-wave frequencies, and/or other suitable frequencies). WLAN/WPAN transceiver circuitry and/or cellular transceiver circuitry may handle voice data and non-voice data.

If desired, the antennas and other wireless circuitry of device 10 may include satellite navigation system circuitry such as Global Positioning System (GPS) receiver circuitry for receiving GPS signals at 1575 MHz or for handling other satellite positioning data (e.g., GLONASS signals at 1609 MHZ). Satellite navigation system signals are received from a constellation of satellites orbiting the earth. Wireless circuitry in device 10 can include circuitry for other short-range (local) and long-range (remote) wireless links if desired. For example, wireless circuitry in device 10 may be provided to receive television and radio signals, paging signals, near field communications (NFC) signals at 13.56 MHz or other suitable NFC frequencies, ultrawideband (UWB) signals (e.g., UWB signals from 6-8.5 GHZ, UWB signals from 3.5-9 GHz, etc.). Wireless circuitry in device 10 may also include antennas and transceiver for handling sensing applications (e.g., radar). If desired, antennas may be provided in arrays (e.g., phased antenna arrays) that support beam steering. These arrangements and other arrangements may be used in supporting wireless communications, wireless sensing, wireless location services, wireless power, and other wireless operations.

The wireless circuitry of device 10 may include antennas that are formed using any suitable antenna types. For example, the antennas of device 10 may include antennas with resonating elements that are formed from slot antenna structures, loop antenna structures, patch antenna structures, stacked patch antenna structures, antenna structures having parasitic elements, inverted-F antenna structures, planar inverted-F antenna structures, helical antenna structures, monopole antennas, dipole antenna structures, Yagi (Yagi-Uda) antenna structures, surface integrated waveguide structures, coils, hybrids of these designs, etc. If desired, one or more of the antennas may be cavity-backed antennas.

Different types of antennas may be used for different bands and combinations of bands. For example, one type of antenna may be used in forming a local wireless link antenna whereas another type of antenna is used in forming a remote wireless link antenna. If desired, space may be conserved within device 10 by using a single antenna to handle two or more different communications bands. For example, a single antenna in device 10 may be used to handle communications in a WiFi® or Bluetooth® communication band while also handling communications at one or more cellular telephone frequencies. In some configurations, some cellular telephone communications (e.g., low-band and mid-band communications) may be handled using a first antenna (e.g., an inverted-F antenna), whereas other communications (e.g., high-band cellular communications) may be handled using one or more phased antenna arrays (e.g., multiple linear patch antenna arrays each of which is mounted in a different orientation and each of which has a different angle of view so that a desired amount of angular coverage is achieved).

To provide antenna structures in device 10 with the ability to cover different frequencies of interest, one or more of the antennas of device 10 may be provided with circuitry such as filter circuitry (e.g., one or more passive filters and/or one or more tunable filter circuits). Discrete components such as capacitors, inductors, and resistors may be incorporated into the filter circuitry. Capacitive structures, inductive structures, and resistive structures may also be formed from patterned metal structures (e.g., part of an antenna). If desired, antenna(s) in device 10 may be provided with adjustable circuits such as tunable components that tune the antenna over communications (frequency) bands of interest. The tunable components may be part of a tunable filter or tunable impedance matching network, may be part of an antenna resonating element, may span a gap between an antenna resonating element and antenna ground, etc.

Radio-frequency transmission line paths may be used to convey antenna signals between the radio-frequency transceiver circuitry of device 10 and the antenna(s) of device 10. These paths may include one or more radio-frequency transmission lines (sometimes referred to herein as transmission lines). Radio-frequency transmission line paths may each include a positive signal conductor and a ground signal conductor. Transmission lines in device 10 may include coaxial cable transmission lines, stripline transmission lines, microstrip transmission lines, edge-coupled microstrip transmission lines, edge-coupled stripline transmission lines, transmission lines formed from waveguide structures (e.g., coplanar waveguides or grounded coplanar waveguides), combinations of these types of transmission lines and/or other transmission line structures.

If desired, matching networks may be used to help match impedances in the wireless circuitry of device 10. A matching network may, for example, include components such as inductors, resistors, and capacitors configured to match the impedance of an antenna to the impedance of an associated radio-frequency transmission line path that is used in coupling the antenna to a transceiver. Matching network components may be provided as discrete components (e.g., surface mount technology components) or may be formed from housing structures, printed circuit board structures, traces on plastic supports, etc. Components such as these may also be used in forming antenna filter circuitry and may be tunable and/or fixed components.

Radio-frequency transmission line paths may be coupled to antenna feed structures associated with antennas in device 10. As an example, an antenna in device 10 such as an inverted-F antenna, a planar inverted-F antenna, a patch antenna, a loop antenna, or other antenna may have an antenna feed with a positive antenna feed terminal and a ground antenna feed terminal. The positive antenna feed terminal may be coupled to an antenna resonating (radiating) element within the antenna. The ground antenna feed terminal may be coupled to an antenna ground in the antenna. The positive feed terminal may be coupled to a positive signal line in a transmission line and the ground feed terminal may be coupled to a ground signal line in the transmission line.

Other types of antenna feed arrangements may be used if desired. For example, an antenna may be fed using multiple feeds each coupled to a respective port of a transceiver over a corresponding transmission line. If desired, a given transmission line signal conductor may be coupled to multiple locations on an antenna and/or switches may be interposed within the paths between a transceiver and the feed terminals of an antenna.

Figure 2:
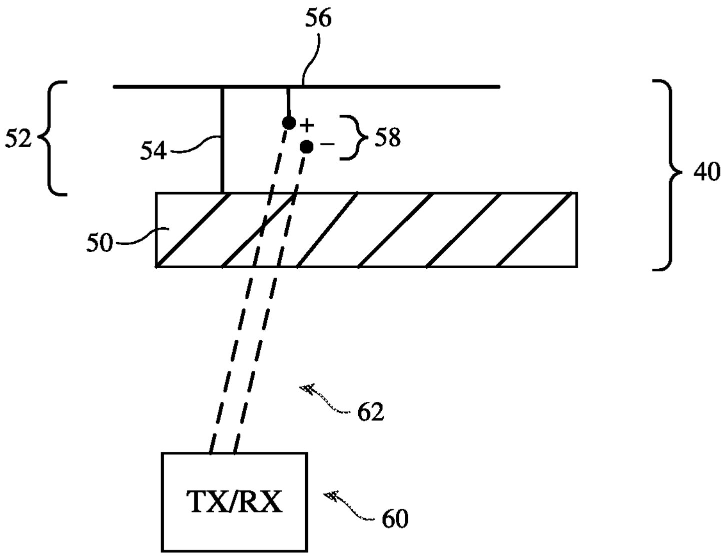
FIG. 2 is a diagram of an illustrative antenna for an electronic device in accordance with an embodiment.

FIG. 2 is a diagram of illustrative wireless communications circuitry for device 10. As shown in FIG. 2, the wireless circuitry includes radio-frequency transceiver 60, which is coupled to antenna 40 by transmission line 62. Antenna 40 may have an antenna resonating element 52 (sometimes referred to as an antenna resonating structure or antenna resonator) and antenna ground 50. Antenna resonating element 52 may be formed from any suitable antenna resonating element structures. In the example of FIG. 2, antenna resonating element 52 is an inverted-F antenna resonating element having resonating element arm 56, which is coupled to ground 50 by return path 54 and which is fed using antenna feed 58. Feed 58 has positive and ground feed terminals coupled respectively to positive and ground signal lines in transmission line 62. Conductive structures making up antenna 40 may be formed from thin-film metal traces on printed circuits (e.g., flexible printed circuits formed from sheets of polyimide or other flexible polymer substrates). If desired, the conductive structures making up antenna 40 (e.g., ground structures for antenna 40) may include conductive structural members such as portions of a housing for device 10 (e.g., a metal chassis and/or other internal and/or external frame structures, metal housing walls, metal component support brackets, and/or other conductive housing structures), and/or other structures in device 10 that are formed from metal and/or other conductive material.

Antennas may be mounted within device 10 using mounting brackets, using biasing structures that press antenna components against housing structures, using adhesive, using screws and other fasteners, using press-fit connections, using solder, welds, conductive adhesive, and/or other conductive attachment mechanisms, using one or more frames, carriers, and/or other internal support structures, and/or other mounting arrangements. In an illustrative configuration, flexible printed circuit antenna 40 has compound curvature and is attached to an overlapping dielectric member such as display cover layer 12CG and/or member 13 that has an opposing surface of matching compound curvature. By matching the compound curvature of the substrate of antenna 40 to the compound curvature of an associated overlapping dielectric layer, antenna 40 may be configured to fit within the potentially tight confines of device 10 without adversely affecting the shape and appearance of device 10. As an example, by matching the compound curvature of the substrate of antenna 40 to the compound curvature of an overlapping dielectric structure such as member 13, antenna 40 can be attached to the inner surface or outer surface of member 13 with adhesive. Display cover layer 12CG may then be mounted on device 10 so that edge portion E of layer 12CG overlaps member 13 and antenna 40.

Figure 3:
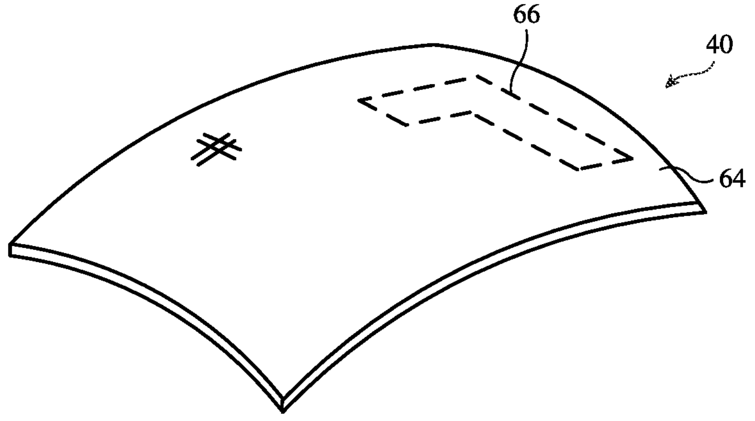
FIG. 3 is a perspective view of an illustrative flexible printed circuit antenna with compound curvature in accordance with an embodiment.

Consider, as an example, the illustrative antenna structures of FIG. 3. As shown in FIG. 3, antenna 40 may be formed from antenna substrate 64. Substrate 64 may be formed from a flexible printed circuit with a surface of compound curvature (sometimes referred to as a non-developable surface). Antenna substrate 64 contains metal traces such as metal trace 66 (e.g., a patterned thin-film metal layer). In an illustrative configuration, substrate 64 has an upper layer (e.g., an upper polyimide layer or other sheet of polymer) and a lower layer (e.g., a lower polyimide layer or other sheet of polymer) and trace 66 is formed from a patterned thin-film metal layer that is between the upper and lower layers. Trace 66 is patterned to form antenna resonating element 52 (FIG. 2) and/or other antenna structures. Antenna 40 of FIG. 3 is formed from a planar sheet of printed circuit substrate material that was contoured in a contouring tool to produce a desired three-dimensional shape with compound curvature. At least some portions of the curved surface of substrate 64 may be characterized by a radius of curvature R of 4 mm to 250 mm, 8 mm to 200 mm, 10 mm to 150 mm, at least 5 mm, at least 12 mm, at least 16 mm, at least 20 mm, at least 30 mm, less than 200 mm, less than 100 mm, less than 75 mm, less than 55 mm, less than 35 mm, and/or other suitable amount of curvature.

Figure 4:
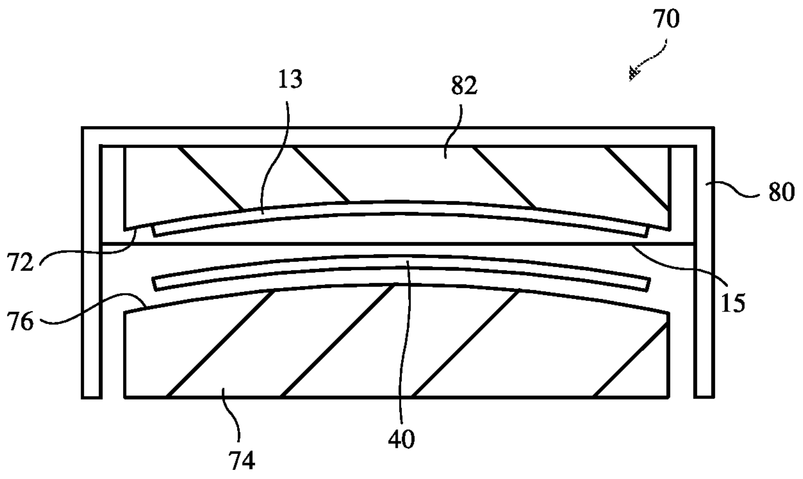
FIG. 4 is a side view of illustrative equipment for laminating a flexible printed circuit antenna to a dielectric member such as a polymer layer in accordance with an embodiment.

After forming a flexible printed circuit antenna with compound curvature of the type shown in FIG. 3, this compound curvature flexible printed circuit antenna may be attached to the surface of a dielectric support structure in device 10. In an illustrative arrangement, the compound curvature flexible printed circuit antenna is attached to the inner surface of dielectric member 13 using a layer of adhesive. FIG. 4 is a cross-sectional side view of an illustrative vacuum lamination tool that may be used in attaching antenna 40 to member 13. As shown in FIG. 4, tool 70 may have movable upper and lower dies such as upper die 82 with concave surface 72 and lower die 74 with convex surface 76. Surfaces 72 and 76 may be characterized by compound curvature (e.g., compound curvature that matches the compound curvature of the inner and outer surfaces of member 13 and that matches the compound curvature of the inner and outer surfaces of flexible printed circuit antenna 40). Prior to lamination, a layer of adhesive such as adhesive 15 may be suspended between member 13 and antenna 40. During lamination, tool 70 may use vacuum enclosure 80 to produce a vacuum while member 30 is pressed against antenna 40 by moving die 82 towards die 74. While pressure is applied between member 13 and antenna 40 in this way, dies 82 and 74 may optionally apply heat to facilitate lamination. The presence of vacuum helps prevent air bubbles from forming as adhesive 15 is compressed between member 30 and antenna 40.

Figure 5:
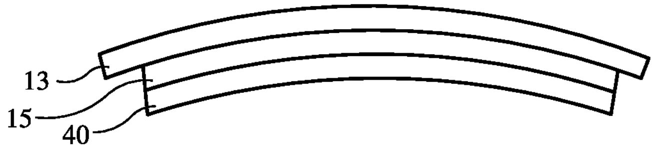
FIG. 5 is a side view of an illustrative printed circuit antenna with compound curvature attached to a compound curvature surface of dielectric member with compound curvature in accordance with an embodiment.

FIG. 5 is a cross-sectional side view of member 13 (e.g., layer 13-2 of FIG. 1 or other dielectric antenna support structure) following lamination in tool 70 to attach antenna 40 to member 13 with adhesive. In general, antenna 40 may be attached to an inner or outer surface of a supporting member and this attachment surface may have convex or concave curvature. In the example of FIG. 5, member 13 has an inwardly facing concave surface of compound curvature and the outwardly facing surface of antenna 40 has matching compound curvature.

After antenna 40 is attached to a shroud or other dielectric member (e.g., member 13 of FIG. 1 or other member) using adhesive 15, the shroud or other dielectric member may be attached to other portions of housing 12 (e.g., using screws or other fasteners, using adhesive, etc.). In arrangements in which member 13 is separate from cover layer 12CG, the attachment of antenna 40 to member 13 may help preserve the ability of cover layer 12CG to be removed (e.g., to permit rework or repair of device 10).

Figure 6:
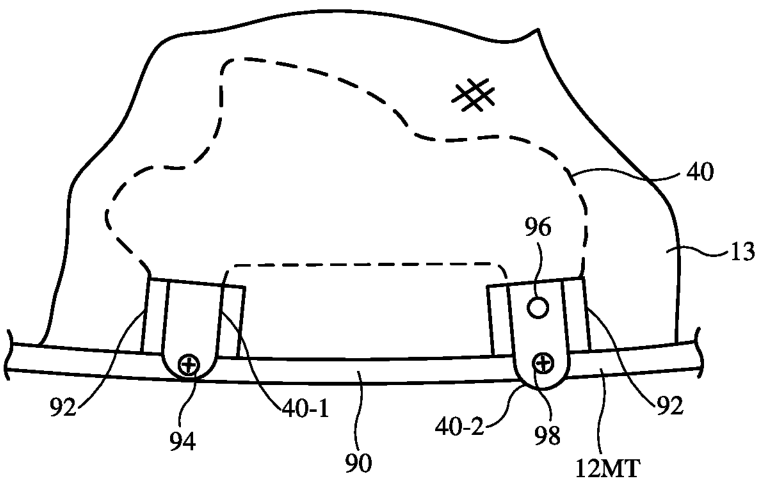
FIG. 6 is a perspective view of an illustrative printed circuit antenna with compound curvature laminated to the inner surface of a dielectric member with compound curvature in accordance with an embodiment.

FIG. 6 is a perspective view of antenna 40 on member 13 taken from the outside of device 10 with cover layer 12CG removed. As shown in the example of FIG. 6, antenna 40 may be mounted to the underside (inner surface) of member 13. The outwardly facing surface of member 13 in FIG. 6 is convex. The opposing inwardly facing surface of member 13 in FIG. 6 is concave (e.g., the surface of member 13 on the far side of member 13 of FIG. 6 is concave). Antenna 40 may have an outwardly facing convex surface that is attached to the concave inwardly facing surface of member 13.

One or more metal structures in device 10 such as metal structure 90 (e.g., a metal chassis or other metal housing structure) may serve as antenna ground 50 of FIG. 2. Member 13 may have openings 92 through which leg portions or other protruding portions of antenna 40 may pass. In the example of FIG. 6, protruding portion 40-1 of antenna 40 has a return path metal trace (forming return path 54 of FIG. 2) that is shorted to metal structure 90 using metal fastener 94. Protruding portion 40-2 of antenna 40 may include a metal trace forming a positive feed terminal. A cable or other transmission line (see, e.g., transmission line 62 of FIG. 2) may be coupled to connector 96. Connector 96 may have a positive terminal coupled to the positive feed terminal and may have a negative terminal that is shorted to metal structure 90 (e.g., via metal fastener 98). Conductive adhesive, solder, welded connections, and/or other conductive connections may be used in attaching the metal trace of antenna 40 to metal structure 90 and connector 96, if desired. The use of fasteners 94 and 98 (e.g., screws) is illustrative. Following installation of member 13 and antenna 40 into device 10 (e.g., by attaching member 13 to housing 12 and attaching antenna 40 to structure 90), cover layer 12CG may be mounted to the front of housing 12, thereby covering member 13 and antenna 40 as shown in FIG. 1.

In some embodiments, sensors may gather personal user information. To ensure that the privacy of users is preserved, all applicable privacy regulations should be met or exceeded and best practices for handling of personal user information should be followed. Users may be permitted to control the use of their personal information in accordance with their preferences.

In accordance with an embodiment, an electronic device is provided that includes a dielectric layer having a first surface of compound curvature, a flexible printed circuit antenna having a second surface of compound curvature, and adhesive between the first and second surfaces that attaches the flexible printed circuit antenna to the dielectric layer.

In accordance with another embodiment, the electronic device includes a head-mounted housing, a display, and a display cover layer overlapping the display and overlapping the dielectric layer.

In accordance with another embodiment, the electronic device includes a glass layer having an inwardly facing third surface of compound curvature, the dielectric layer is between the third surface and the second surface.

In accordance with another embodiment, the electronic device includes a radio-frequency transceiver configured to transmit and receive wireless signals using the antenna, the flexible printed circuit antenna has a metal trace configured to form an inverted-F antenna resonator.

In accordance with another embodiment, the electronic device includes a metal chassis that serves as an antenna ground, the inverted-F antenna resonator is coupled to the metal chassis.

In accordance with another embodiment, the electronic device includes a head-mounted housing, left and right displays configured to display respective left and right images to left and right eye boxes, and a publicly viewable display that faces away from the left and right eye boxes.

In accordance with another embodiment, the electronic device includes a display cover layer overlapping the publicly viewable display.

In accordance with another embodiment, the display cover layer has an edge portion that overlaps the dielectric layer and the flexible printed circuit antenna.

In accordance with another embodiment, the display cover layer is a glass layer and the edge portion has an inner edge surface of compound curvature.

In accordance with another embodiment, the dielectric layer includes a polymer layer with an outer surface facing the inner edge surface.

In accordance with another embodiment, the first surface is a concave surface of compound curvature.

In accordance with another embodiment, the electronic device includes a glass layer, the dielectric layer is between the glass layer and the antenna.

In accordance with an embodiment, an antenna is provided that includes an antenna resonator formed from a metal trace on a flexible printed circuit substrate of compound curvature, an antenna ground, and an antenna feed having a first terminal coupled to the metal trace and a second trace coupled to the antenna ground.

In accordance with another embodiment, the antenna ground includes a head-mounted device chassis.

In accordance with another embodiment, the flexible printed circuit substrate is configured to attach to a compound curvature surface of a dielectric layer using adhesive.

In accordance with an embodiment, a head-mounted device is provided that includes left and right rear-facing displays configured to display respective left and right images to eye boxes, a publicly viewable display facing away from the eye boxes, a dielectric layer, and a flexible printed circuit antenna having a surface of compound curvature that is attached to the dielectric layer.

In accordance with another embodiment, the dielectric layer has a portion surrounding the publicly viewable display and the flexible printed circuit antenna is attached to the portion with adhesive.

In accordance with another embodiment, the portion has an inner surface of compound curvature to which the flexible printed circuit antenna is attached with the adhesive.

In accordance with another embodiment, the head-mounted device includes a head-mounted housing that supports the left and right rear-facing displays and that has a metal chassis that forms an antenna ground for the flexible printed circuit antenna.

In accordance with another embodiment, the head-mounted device includes a display cover layer having an outer surface of compound curvature that overlaps the publicly viewable display and having an edge portion that overlaps the portion of the dielectric layer and overlaps the flexible printed circuit antenna.

The foregoing is merely illustrative and various modifications can be made to the described embodiments. The foregoing embodiments may be implemented individually or in any combination.

What is claimed is:

1. An electronic device, comprising:

a dielectric layer having a first surface of compound curvature;

a flexible printed circuit antenna having a second surface of compound curvature; and adhesive between the first and second surfaces that attaches the flexible printed circuit antenna to the dielectric layer, wherein the flexible printed circuit antenna has first and second polymer layers and a metal trace between the first and second polymer layers and configured to form an antenna resonating element.

2. The electronic device defined in claim 1 further comprising:

a head-mounted housing;

a display; and a display cover layer overlapping the display and overlapping the dielectric layer.

3. The electronic device defined in claim 1 further comprising:

a glass layer having an inwardly facing third surface of compound curvature, wherein the dielectric layer is between the third surface and the second surface.

4. The electronic device defined in claim 1 further comprising:

a radio-frequency transceiver configured to transmit and receive wireless signals using the flexible printed circuit antenna, wherein the metal trace is configured to form an inverted-F antenna resonator.

5. The electronic device defined in claim 4 further comprising a metal chassis that serves as an antenna ground, wherein the inverted-F antenna resonator is coupled to the metal chassis.

6. The electronic device defined in claim 1 further comprising:

a head-mounted housing;

left and right displays configured to display respective left and right images to left and right eye boxes; and a publicly viewable display that faces away from the left and right eye boxes.

7. The electronic device defined in claim 6 further comprising a display cover layer overlapping the publicly viewable display.

8. The electronic device defined in claim 7 wherein the display cover layer has an edge portion that overlaps the dielectric layer and the flexible printed circuit antenna.

9. The electronic device defined in claim 8 wherein the display cover layer is a glass layer and wherein the edge portion has an inner edge surface of compound curvature.

10. The electronic device defined in claim 9 wherein the dielectric layer comprises a polymer layer with an outer surface facing the inner edge surface.

11. The electronic device defined in claim 10 wherein the first surface is a concave surface of compound curvature.

12. The electronic device defined in claim 1 further comprising a glass layer, wherein the dielectric layer is between the glass layer and the flexible printed circuit antenna.

13. The electronic device defined in claim 1, wherein the first and second polymer layers and the metal trace have compound curvature.

14. The electronic device defined in claim 1, wherein the flexible printed circuit antenna comprises an antenna ground formed from a metal chassis and comprises an antenna feed having a first terminal coupled to the metal trace and a second terminal coupled to the antenna ground.

15. The electronic device defined in claim 1, wherein the first and second polymer layers and the metal trace form a flexible printed circuit substrate and wherein the adhesive attaches the flexible printed circuit substrate to the first surface of compound curvature of the dielectric layer.

16. A head-mounted device, comprising:

left and right rear-facing displays configured to display respective left and right images to eye boxes;

a publicly viewable display facing away from the eye boxes;

a dielectric layer having a first portion that overlaps the publicly viewable display and having a second portion that surrounds the publicly viewable display;

a display cover layer that overlaps the publicly viewable display and having an edge portion that overlaps the second portion that surrounds the publicly viewable display; and a flexible printed circuit antenna having a surface of compound curvature that is attached to the second portion that surrounds the publicly viewable display, wherein the flexible printed circuit antenna is configured to convey antenna signals through the second portion that surrounds the publicly viewable display and through the edge portion of the display cover layer.

17. The head-mounted device defined in claim 16 wherein the flexible printed circuit antenna is attached to the second portion with adhesive.

18. The head-mounted device defined in claim 17 wherein the second portion has an inner surface of compound curvature to which the flexible printed circuit antenna is attached with the adhesive.

19. The head-mounted device defined in claim 18 wherein the head-mounted device comprises a head-mounted housing that supports the left and right rear-facing displays and that has a metal chassis that forms an antenna ground for the flexible printed circuit antenna.

20. The head-mounted device defined in claim 19 wherein the display cover layer has an outer surface of compound curvature that overlaps the publicly viewable display and wherein the edge portion overlaps the flexible printed circuit antenna.

* * * * *